(12) United States Patent  
Reed

(10) Patent No.: US 9,433,199 B2  
(45) Date of Patent: Sep. 6, 2016

(54) LIGHTED FISHING FLOAT WITH IMPROVED LINE CLAMP

(71) Applicant: Robert Reed, Independence, MO (US)

(72) Inventor: Robert Reed, Independence, MO (US)

(*) Notice: Subject to any disclaimer, the term of this patent is extended or adjusted under 35 U.S.C. 154(b) by 107 days.

(21) Appl. No.: 14/581,267

(22) Filed: Dec. 23, 2014

(65) Prior Publication Data

US 2015/0173337 A1     Jun. 25, 2015

Related U.S. Application Data

(60) Provisional application No. 61/920,236, filed on Dec. 23, 2013.

(51) Int. Cl.
*A01K 91/00* (2006.01)
*A01K 93/00* (2006.01)

(52) U.S. Cl.
CPC .................................. *A01K 93/00* (2013.01)

(58) Field of Classification Search
USPC ................................. 43/44.87, 17.5, 43.1, 17
See application file for complete search history.

(56) References Cited

U.S. PATENT DOCUMENTS

| | | | | |
|---|---|---|---|---|
| 2,548,355 A | * | 4/1951 | Dolejs, Sr. | A01K 93/00 24/131 R |
| 2,726,476 A | * | 12/1955 | Coughlin | A01K 93/00 43/44.88 |
| 3,011,285 A | * | 12/1961 | Musser | A01K 93/00 43/44.87 |
| 3,664,053 A | * | 5/1972 | Beverly | A01K 93/00 43/43.14 |
| 3,693,278 A | | 9/1972 | Mahone, Jr. | |
| 3,739,513 A | * | 6/1973 | Durham, Jr. | A01K 93/02 43/17 |
| 3,913,256 A | | 10/1975 | Morris et al. | |
| 4,010,567 A | | 3/1977 | MacMillan | |
| 4,234,913 A | | 11/1980 | Ramme | |
| 4,461,114 A | | 7/1984 | Riead | |
| 4,475,301 A | | 10/1984 | Wortham | |
| 4,486,969 A | | 12/1984 | Swenson | |
| 4,658,532 A | | 4/1987 | McFarland et al. | |
| 4,760,664 A | * | 8/1988 | Amendola | A01K 85/01 43/17.5 |
| 4,916,846 A | | 4/1990 | Pehm | |
| 4,922,643 A | | 5/1990 | Everett | |
| 5,915,941 A | * | 6/1999 | Casey | A01K 93/02 43/17.5 |
| 5,974,721 A | | 11/1999 | Johnson et al. | |
| 7,225,580 B1 | | 6/2007 | Chou | |
| 7,272,908 B2 | | 9/2007 | Jones | |
| 7,413,319 B2 | | 8/2008 | Longoria et al. | |
| 7,717,582 B2 | | 5/2010 | Longoria et al. | |
| 8,572,886 B2 | * | 11/2013 | Bennis | A01K 93/00 43/17 |
| 8,819,986 B2 | * | 9/2014 | Bennis | A01K 91/03 43/17.5 |
| 9,055,736 B1 | * | 6/2015 | DeLucca | A01K 93/02 |
| 2012/0180376 A1 | * | 7/2012 | Nelson | A01K 93/00 43/44.9 |

FOREIGN PATENT DOCUMENTS

JP     CA 2291327 A1 *   6/2000 ............. A01K 91/02

* cited by examiner

*Primary Examiner* — Christopher P Ellis
(74) *Attorney, Agent, or Firm* — Erickson Kernell IP, LLC

(57) ABSTRACT

A fishing float with an improved line arrestor to releasably clamp the fishing float to the fishing line. The line arrestor includes a lock clamp and a slip clamp so that the line may be secured to the fishing line at a desired position, or alternatively may be secured to the fishing line yet allow the fishing float to slip along the line. The fishing float may include a light to allow for night fishing and to attract fish.

19 Claims, 3 Drawing Sheets

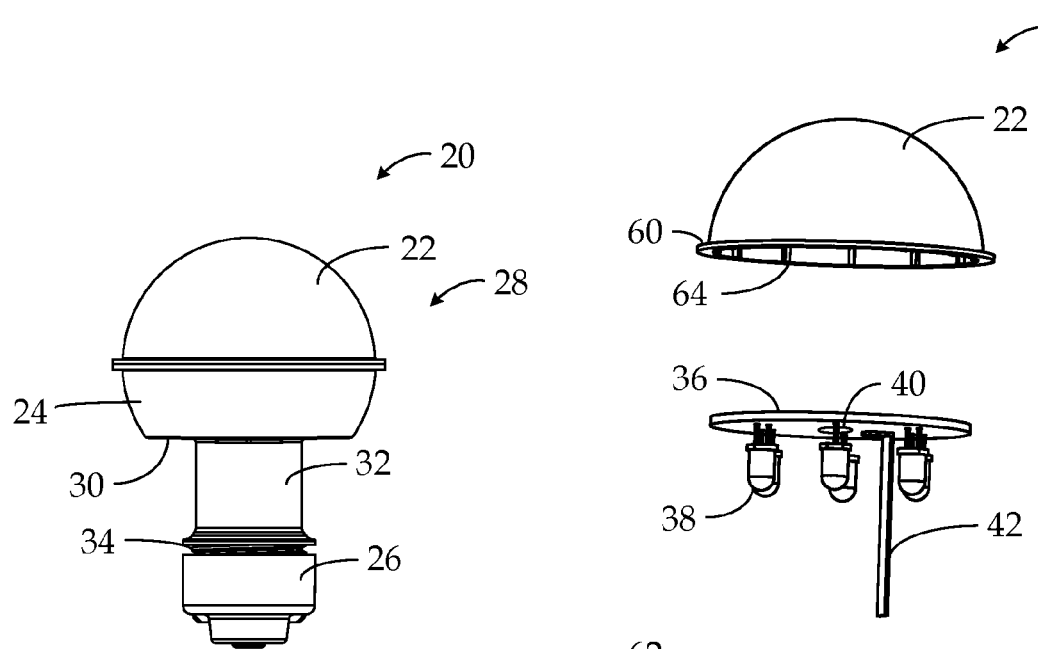
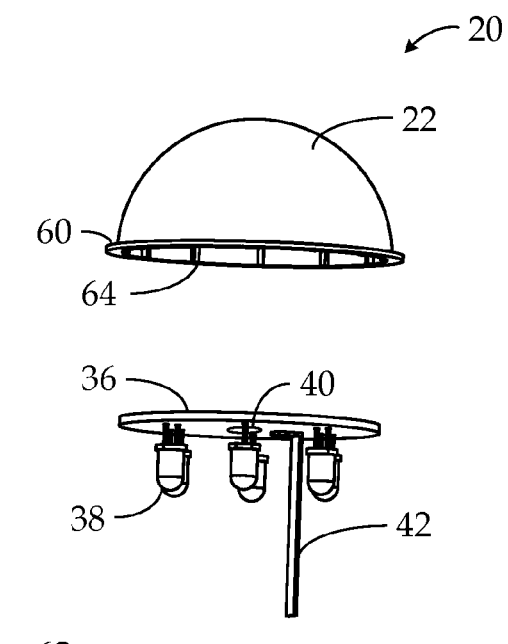
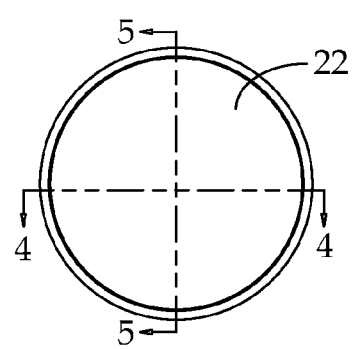
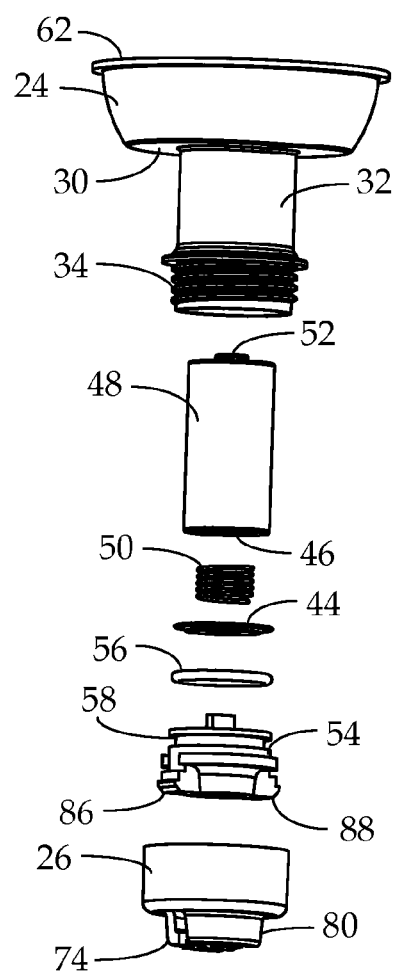
Fig. 1
Fig. 2
Fig. 3

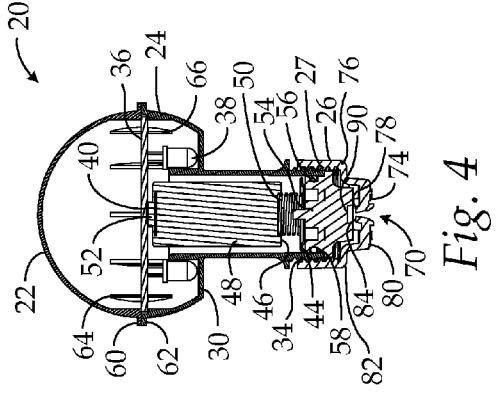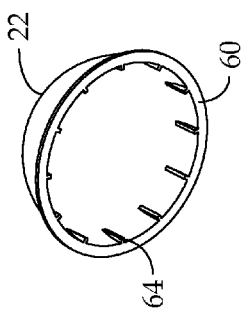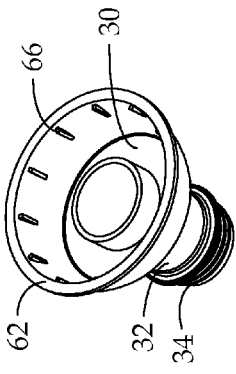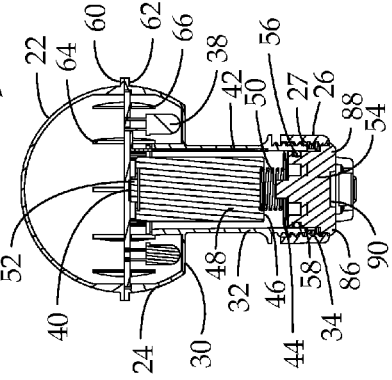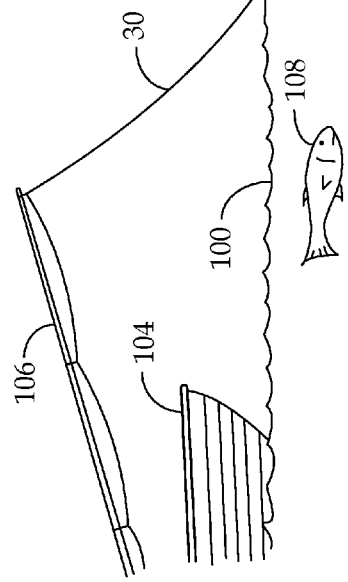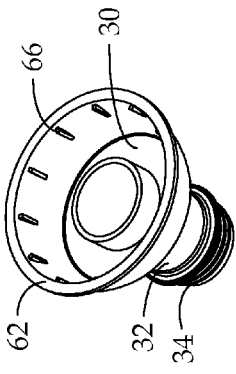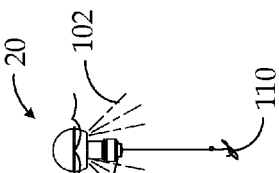

US 9,433,199 B2

LIGHTED FISHING FLOAT WITH IMPROVED LINE CLAMP

CROSS-REFERENCE TO RELATED APPLICATION

This application claims the benefit of provisional application Ser. No. 61/920,236, filed on Dec. 23, 2013, entitled LIGHTED FISHING FLOAT WITH IMPROVED LINE CLAMP.

FIELD

The present invention generally relates to a fishing float and, more particularly, to a fishing float with a light source for locating the float at night and attracting fish, and an improved line clamp for releasably securing a fishing line thereto.

BACKGROUND

A fishing float normally consists of a buoyant body member attachable to a fishing line at any desired distance from the hook and lure attached to the end of the line, and operable as it floats at the water surface to support the hook and lure at any distance below the surface at which it may be desired to fish. The float may be attached to any point of the line for this purpose, by means of a clamp device incorporated in the float body itself. Typically the fishing float is configured to be used during the day.

The line clamps in the most common use at the present time usually incorporate a wire projecting from the lure body and having its outer end bent to form a re-entrant hook, and a plunger encircling the wire and spring biased outwardly to enclose both reaches of the wire hook. When the plunger is refracted inwardly by manual force, the end of the shorter reach of the hook is exposed so that a fishing line may be introduced laterally into the hook, so that when the plunger is released, the line is clamped between the plunger and the closed end of the hook. Certain shortcomings and disadvantages have become apparent in clamps of this type. Most importantly, they have a pronounced tendency to slide or slip along the fishing line, so that their pre-arranged spacing from the hook and lure at the end of the line does not remain constant. This tendency arises from the facts that such "wire-hook" clamps engage the line at only one point, and that the monofilament nylon strands commonly used for fishing lines are very hard and smooth, so that it is difficult to clamp them with enough force and tightness to preclude slipping. The difficulty is further aggravated by the fact that nylon has a "self-lubricating" characteristic, which further increases the tendency to slip. The "wire-hook" clamps also are often relatively expensive to manufacture, and require a not insignificant degree of manual dexterity to operate.

Other line clamps securely clamp the line to the fishing float so that the line cannot slip even if desired.

Further, the typical fishing floats do not include a light for fishing at night and to attract fish.

SUMMARY

The present invention provides a fishing float with an improved line arrestor to releasably clamp the fishing float to the line. The line arrestor includes a lock clamp and a slip clamp so that the line may be secured to the fishing line at a desired position, or alternatively may be secured to the fishing line yet allow the fishing float to slip along the line. Additionally, the fishing float may include a light source to allow for night fishing and to attract fish.

DESCRIPTION OF THE DRAWINGS

FIG. 1 is a side elevational view of a lighted fishing float of the present invention.
FIG. 2 is a top view of the lighted fishing float of FIG. 1.
FIG. 3 is an exploded view of the lighted fishing float of FIG. 1.
FIG. 4 is a sectional view of the lighted fishing float of FIG. 2 along section line 4-4.
FIG. 5 is a sectional view of the lighted fishing float of FIG. 2 along section line 5-5.
FIG. 6 is a perspective view of the top of the lighted fishing float of FIG. 3.
FIG. 7 is a perspective view of the printed circuit board of the lighted fishing float of FIG. 3.
FIG. 8 is a perspective view of the base of the lighted fishing float of FIG. 3.
FIG. 18 is an environmental view of the lighted fishing float of FIG. 1.

DESCRIPTION

Figure 9:
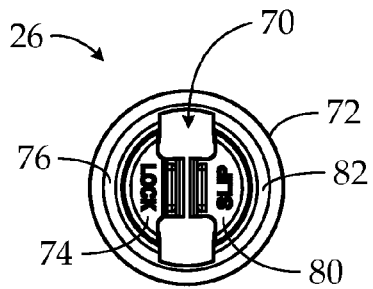
FIG. 9 is a plan view of the outside of the cap of the lighted fishing float of FIG. 1.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Referring initially to FIGS. 1-8, the lighted fishing float of the present invention is generally indicated by reference numeral 20. The lighted fishing float 20 includes a top 22, base 24 and cap 26. The top 22 is sealed to the base 24 presenting a housing 28. The housing 28 may be shaped as a truncated sphere with a flat bottom 30 opposite the top 22 with a cylindrical tube 32 extending from the bottom 30. The cylindrical tube 32 includes a threaded portion 34 at the end opposite the flat bottom 30. The cap 26 includes an internal thread 27 matching the threaded portion 34 of the cylindrical tube 32 of the base 24.

Mounted within the housing 28 is a printed circuit board 36 with downwardly projecting LEDs 38 mounted thereto. The positive leads of one or more of the LEDs 38 may be connected together in parallel or in series and are connected to a positive contact 40. The negative leads of one or more of the LEDs may also be connected together in parallel or series, and are connected to a negative lead 42 extending downwardly from the printed circuit board 36 along the inside surface of the cylindrical tube 32 toward the threaded portion 34. The negative lead 42 makes contact with a negative contact 44, which is in electrical contact with a negative terminal 46 of a battery 48. A spring 50 or other contact provides a biased connection between the negative contact 44 and the negative terminal 46 of the battery 48. When the lighted fishing float 20 is assembled, the positive terminal 52 of battery 48 makes contact with the positive contact 40 to complete the circuit and illuminate the LEDs 38. A line arrestor 54 fits within the cap 26 and an O-ring 56, which is seated in a groove 58 in the arrestor 54, provides a water tight seal to keep water out of the lighted fishing float 20.

The housing 28 is made of a durable, injection-molded plastic. The top 22 is fastened and sealed to the base 24 along rim surfaces 60 and 62. The top 22 may include structural ribs 64 for added strength around the periphery. The base 24 may also include structural ribs 66 for added strength around the periphery and may be aligned with the ribs 64 of the top 22 for added strength. The flat bottom 30 of the housing 28 may be transparent to permit the light from the LEDs 38 to be transmitted from the housing 28. The LEDs 38 may emit a green light to attract fish. The flat bottom 30 may be a colored transparent plastic, such as green, for use with white LEDs, or other combinations to emit a green or other color light from the fishing float 20.

Figure 13:
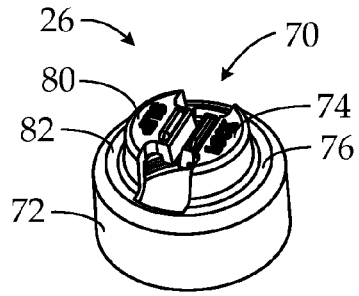
FIG. 13 is a perspective view of the cap of FIG. 9.
Figure 10:
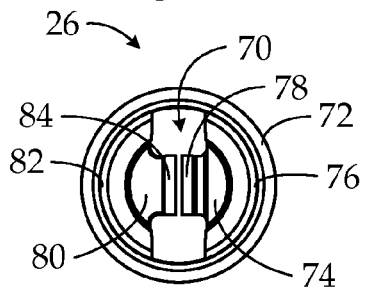
FIG. 10 is a plan view of the inside of the cap of the lighted fishing float of FIG. 3.
Figure 14:
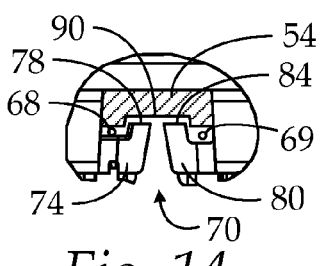
FIG. 14 is an enlarged, partial sectional view of the cap of FIG. 12 shown with the cap in a loosened position.
Figure 15:
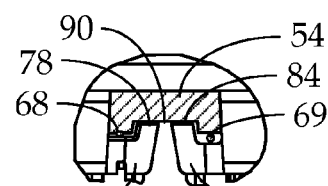
FIG. 15 is an enlarged, partial sectional view of the cap of FIG. 12 shown with the cap in a tightened position.
Figure 11:
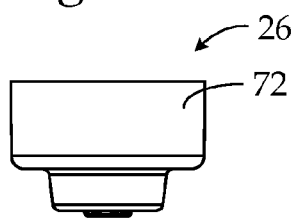
FIG. 11 is a side view of the cap of FIG. 9.
Figure 16:
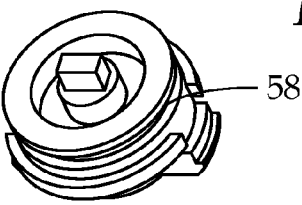
FIG. 16 is a perspective view of the line arrestor of the lighted fishing float of FIG. 3.
Figure 12:
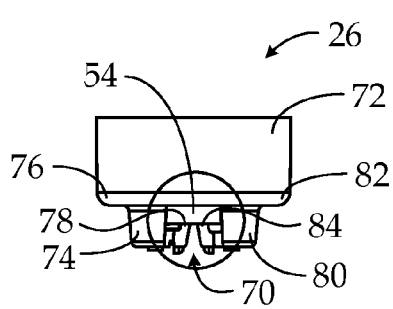
FIG. 12 is a side view of the cap of FIG. 9.
Figure 17:
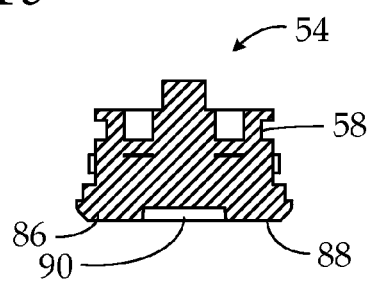
FIG. 17 is a cross-sectional view of the line arrestor of FIG. 16.

Referring to FIGS. 3-5 and 9-17, when the cap 26 is threaded onto the threaded portion 34 of the base 24, the spring contact 50 is compressed against the negative terminal 46 of the battery 48 forcing the positive terminal 52 into contact with the positive contact 40 of the circuit board 36. When the circuit is thus completed, the LEDs 38 are illuminated. The battery 48 may be a three-volt battery, such as a type 123A lithium battery for powering the LEDs 38.

The line arrestor 54 and the cap 26 work in combination to secure the lighted fishing float 20 to a fishing line 68 or 69. The cap 26 includes a channel 70, a threaded periphery 72, a J-shaped lock tab 74 extending from one side 76 of the periphery 72 with a free end 78 extending into the channel 70, and a J-shaped slip tab 80 extending from the opposite side 82 of the periphery 72 with a free end 84 extending into the channel 70.

The line arrestor 54 includes left 86 and right 88 wings that are designed to snap into the channel 70 of the cap 26. Between the wings 86 and 88 is a rectangular cavity 90 configured to receive the free end 78 of the J-shaped lock tab 74 and the free end 84 of J-shaped slip tab 80. A body portion of the J-shaped lock tab 74 is slightly thicker than a body portion of the J-shaped slip tab 80. Alternatively, the body portions of the J-shaped lock tab 74 and J-shaped slip tab 80 may have the same thickness, and the height of left wing 86 may be greater than the height of right wing 88.

As the cap 26 is tightened on the base 24, the cap 24 slips over the line arrestor 54 forcing the J-shaped lock tab 74 and the J-shaped slip tab 80 into the rectangular cavity 90. Before the cap 26 is tightened, the fishing line 68 may be slipped into the channel 70, between the J-shaped lock tab 74 and the line arrestor 54, or the fishing line 69 may be slipped into the channel 70, between the J-shaped slip tab 80 and the line arrestor 54. As the cap 26 is tightened, the line 68 is compressed between the lower portion of the J-shaped lock tab 74 and the left wing 86 of the line arrestor 54.

If the line 69 is between the J-shaped slip tab 80 and the line arrestor 54, the free end 84 of the J-shaped slip tab 80 contacts the bottom surface of the rectangular cavity 90 before the line 69 is compressed. The line 69 is captured by the J-shaped slip tab 80 and the right wing 88 of the line arrestor 54, permitting the lighted fishing float 20 to slip on the fishing line 69 but preventing the lighted fishing float 20 from coming free from the fishing line 69. It is noted that although two fishing lines 68 and 69 have been described above and illustrated in FIGS. 14 and 15, this is to explain the two placements of a single fishing line in a locked position where the lighted fishing float 20 is secured to the fishing line at a fixed position on the line, and a variable position where the lighted fishing float 20 is secured to the fishing lines but can slide along the line.

Further referring to FIG. 18, as the cap 26 is tightened on the base 26, the line arrestor 54 is forced against the negative contact 44 and compresses the spring 50 against the negative terminal 46 of the battery 48. The negative contact 44 slides within the cylindrical tube 32 of the base 24 until it contacts the negative lead 42. At the same time, the battery 48 slides within the cylindrical tube 32 until the positive terminal 52 is in contact with the positive contact 40, completing the circuit and illuminating the LEDs 38. When the cap 26 is tightened on the base 26, the fishing line 68 is locked in position and the O-ring 56 presents a water-tight seal to keep water from entering the housing 28. Air trapped within the housing 28 keeps the lighted fishing float afloat. Further, the weight of the battery 48 keeps the lighted fishing float 20 upright in the water 100. The light 102 from the LEDs 38 allows a person to fish at night from a shore, dock or boat 104, for example, with a rod 106 and see when a fish 108 strikes the fishing lure or bait 110. The light 102 from the LEDs 38 also attract fish to enhance the opportunity to catch a fish and enjoyment of the fishing experience.

It is to be understood that while certain now preferred forms of this invention have been illustrated and described, it is not limited thereto except insofar as such limitations are included in the following claims.

Having thus described the invention, what is claimed as new and desired to be secured by Letters Patent is as follows:

1. A fishing float comprising:
   a housing having top, a base, a tube extending downwardly from said base and having an open end;
   a cap removably engaged with said open end of said tube, said cap having lock tab and a slip tab; and
   a line arrestor received within said open end of said tube and secured by said cap, said line arrestor cooperating with said lock tab to capture a fishing line between said line arrestor and said lock tab to secure said fishing line to said fishing float without slipping, and said line arrestor cooperating with said slip tab to capture a fishing line between said line arrestor and said slip tab to secure said fishing line said fishing float allowing said fishing float to slip on said fishing line.

2. The fishing float of claim 1 wherein said line arrestor includes a cavity, wherein said lock tab includes a free end extending into said cavity, and wherein said slip tab includes a free end extending into said cavity.

3. The fishing float of claim 1 wherein said lock tab includes a body portion and said slip tab includes a body portion, wherein said lock tab body portion is thicker than said slip tab body portion.

4. The fishing float of claim 1 wherein said line arrestor includes a right wing cooperating with said lock tab to secure said fishing line to said fishing float without slipping.

5. The fishing float of claim 1 wherein said line arrestor includes a left wing cooperating with said slip tab to secure said fishing line said fishing float allowing said fishing float to slip on said fishing line.

6. The fishing float of claim 1 further comprising a light source and battery mounted in said housing, and means for selectively applying power from said battery to said light source.

7. The fishing float of claim 6 wherein when said cap is tightened on said tube, power is applied from said battery to said light source.

8. A fishing float comprising:
a housing having top, a base, a cylindrical tube extending downwardly from said base and having an open end;
a cap removably engaged with said open end of said cylindrical tube, said cap having lock tab and a slip tab;
said lock tab having a fixed end secured to a periphery of said cap and a free end extending inwardly to a center of said cap;
said slip tab having a fixed end secured to said periphery of said cap opposite said lock tab first end and a free end extending inwardly to said center of said cap toward said lock tab free end, and presenting a channel therebetween;
a line arrestor received within said open end of said cylindrical tube and secured by said cap, said line arrestor cooperating with said lock tab to capture a fishing line between said line arrestor and said lock tab to secure said fishing line to said fishing float without slipping, and said line arrestor cooperating with said slip tab to capture a fishing line between said line arrestor and said slip tab to secure said fishing line said fishing float allowing said fishing float to slip on said fishing line.

9. The fishing float of claim 8 wherein said line arrestor includes a cavity, wherein said lock tab free end extends into said cavity, and wherein said slip tab free end extends into said cavity.

10. The fishing float of claim 8 wherein said lock tab includes a body portion between said lock tab fixed end and said lock tab free end, wherein said slip tab includes a body portion between said slip tab fixed end and said slip tab free end, and wherein said lock tab body portion is thicker than said slip tab body portion.

11. The fishing float of claim 10 wherein said line arrestor includes a right wing cooperating with said lock tab body portion to secure said fishing line to said fishing float without slipping.

12. The fishing float of claim 10 wherein said line arrestor includes a left wing cooperating with said slip tab body portion to secure said fishing line said fishing float allowing said fishing float to slip on said fishing line.

13. The fishing float of claim 8 further comprising a light source and battery mounted in said housing, and means for selectively applying power from said battery to said light source.

14. The fishing float of claim 13 wherein when said cap is tightened on said tube, power is applied from said battery to said light source.

15. A fishing float comprising:
a housing having top, a base, a cylindrical tube extending downwardly from said base and having an open end;
a cap removably engaged with said open end of said cylindrical tube, said cap having lock tab and a slip tab;
said J-shaped lock tab having a fixed end secured to a periphery of said cap and a free end extending inwardly to a center of said cap;
said J-shaped slip tab having a fixed end secured to said periphery of said cap opposite said lock tab first end and a free end extending inwardly to said center of said cap toward said lock tab free end, and presenting a channel therebetween;
a line arrestor having a cavity and received within said open end of said cylindrical tube and secured by said cap, said line arrestor cooperating with said J-shaped lock tab to capture a fishing line between said line arrestor and said J-shaped lock tab to secure said fishing line to said fishing float without slipping, and said line arrestor cooperating with said J-shaped slip tab to capture a fishing line between said line arrestor and said J-shaped slip tab to secure said fishing line said fishing float allowing said fishing float to slip on said fishing line.

16. The fishing float of claim 15 wherein said J-shaped lock tab free end extends into said cavity, and wherein said J-shaped slip tab free end extends into said cavity.

17. The fishing float of claim 15 wherein said J-shaped lock tab includes a body portion between said J-shaped lock tab fixed end and said J-shaped lock tab free end, wherein said J-shaped slip tab includes a body portion between said J-shaped slip tab fixed end and said J-shaped slip tab free end, and wherein said J-shaped lock tab body portion is thicker than said J-shaped slip tab body portion.

18. The fishing float of claim 15 wherein said line arrestor includes a right wing cooperating with said J-shaped lock tab body portion to secure said fishing line to said fishing float without slipping, and wherein said line arrestor includes a left wing cooperating with said J-shaped slip tab body portion to secure said fishing line said fishing float allowing said fishing float to slip on said fishing line.

19. The fishing float of claim 15 further comprising a light source and battery mounted in said housing, wherein when said cap is tightened on said tube, power is applied from said battery to said light source.

* * * * *